Jan. 20, 1959  G. R. DEMPSTER  2,869,740
TRANSPORTING EQUIPMENT
Filed April 10, 1956  4 Sheets-Sheet 2
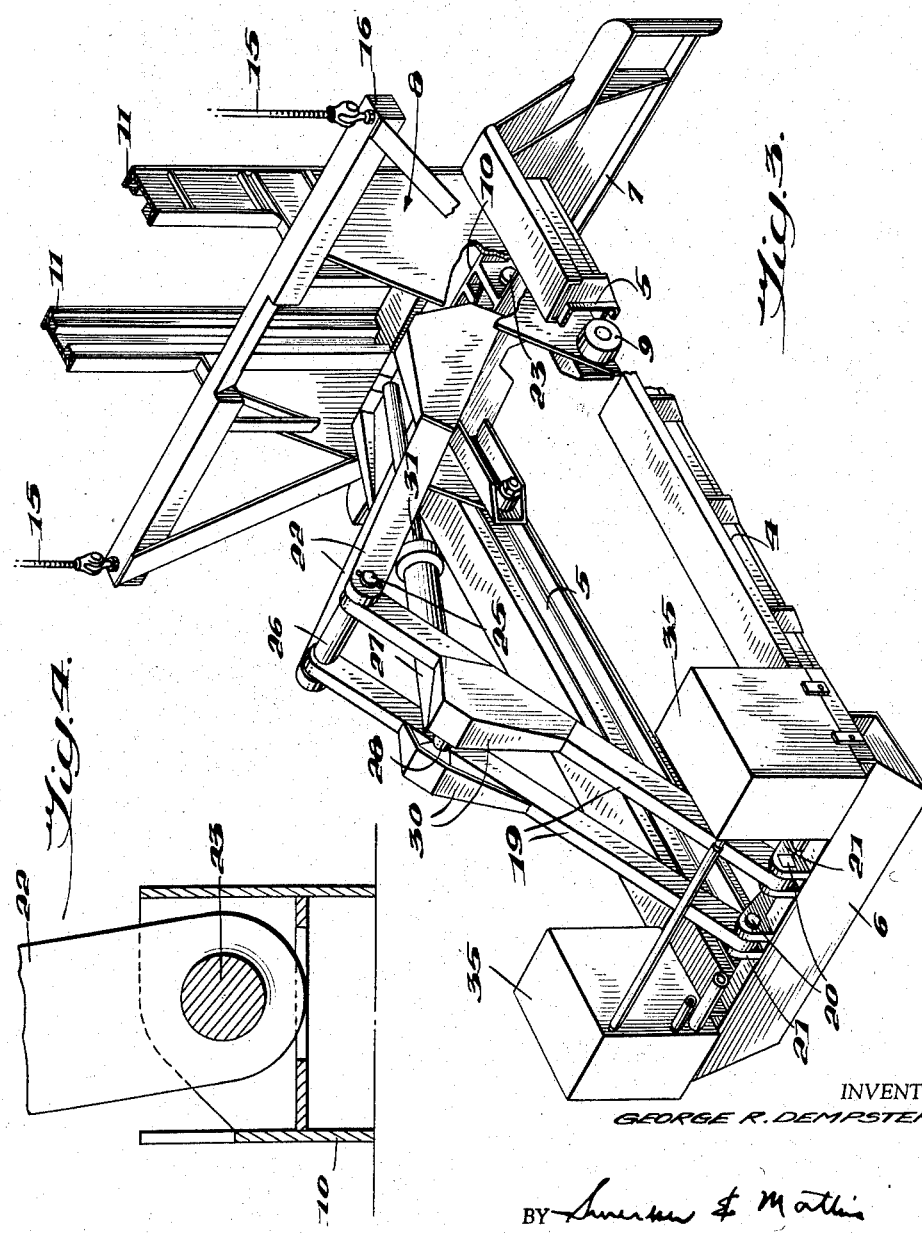
INVENTOR
GEORGE R. DEMPSTER,
BY
ATTORNEYS

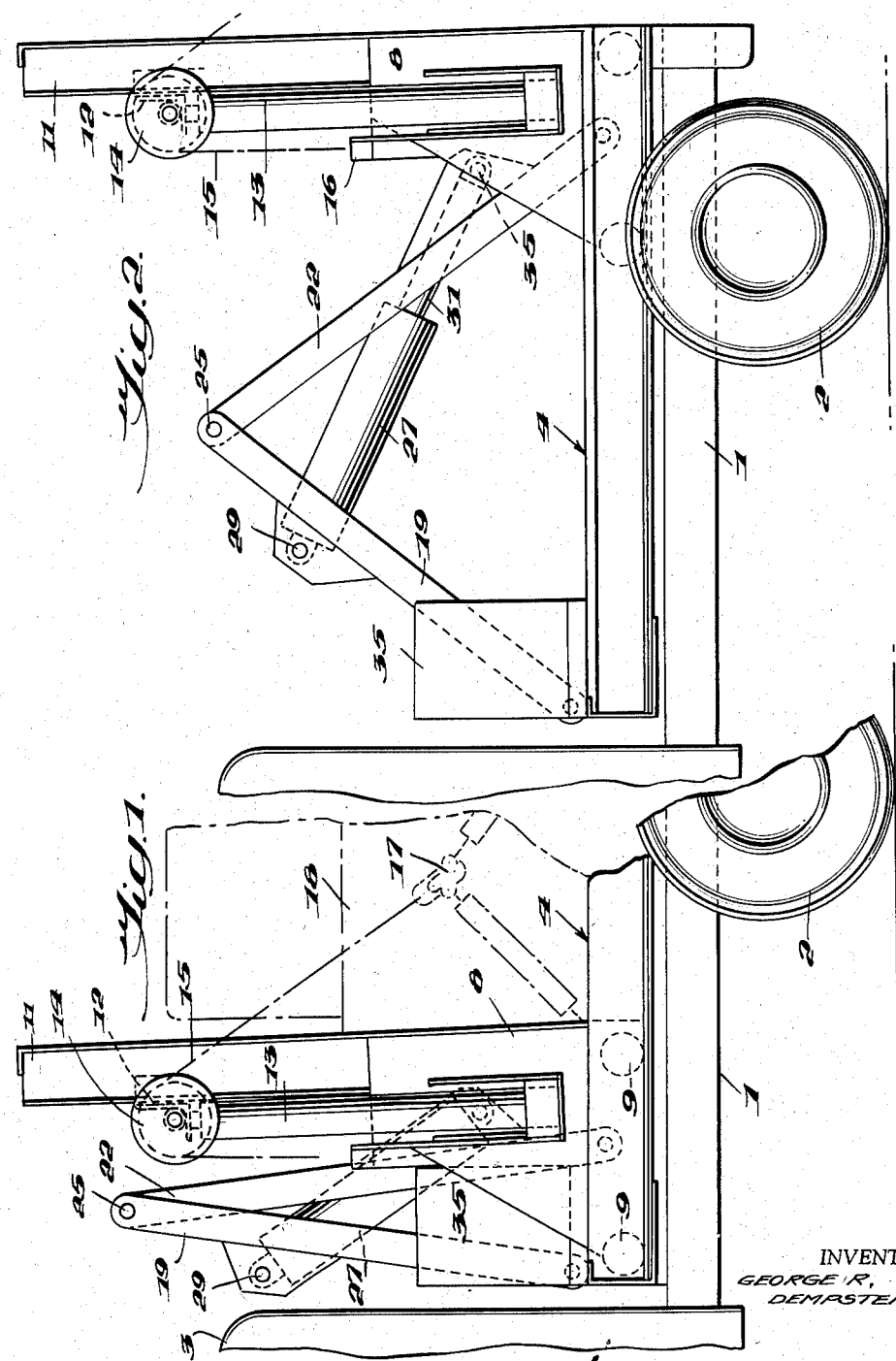

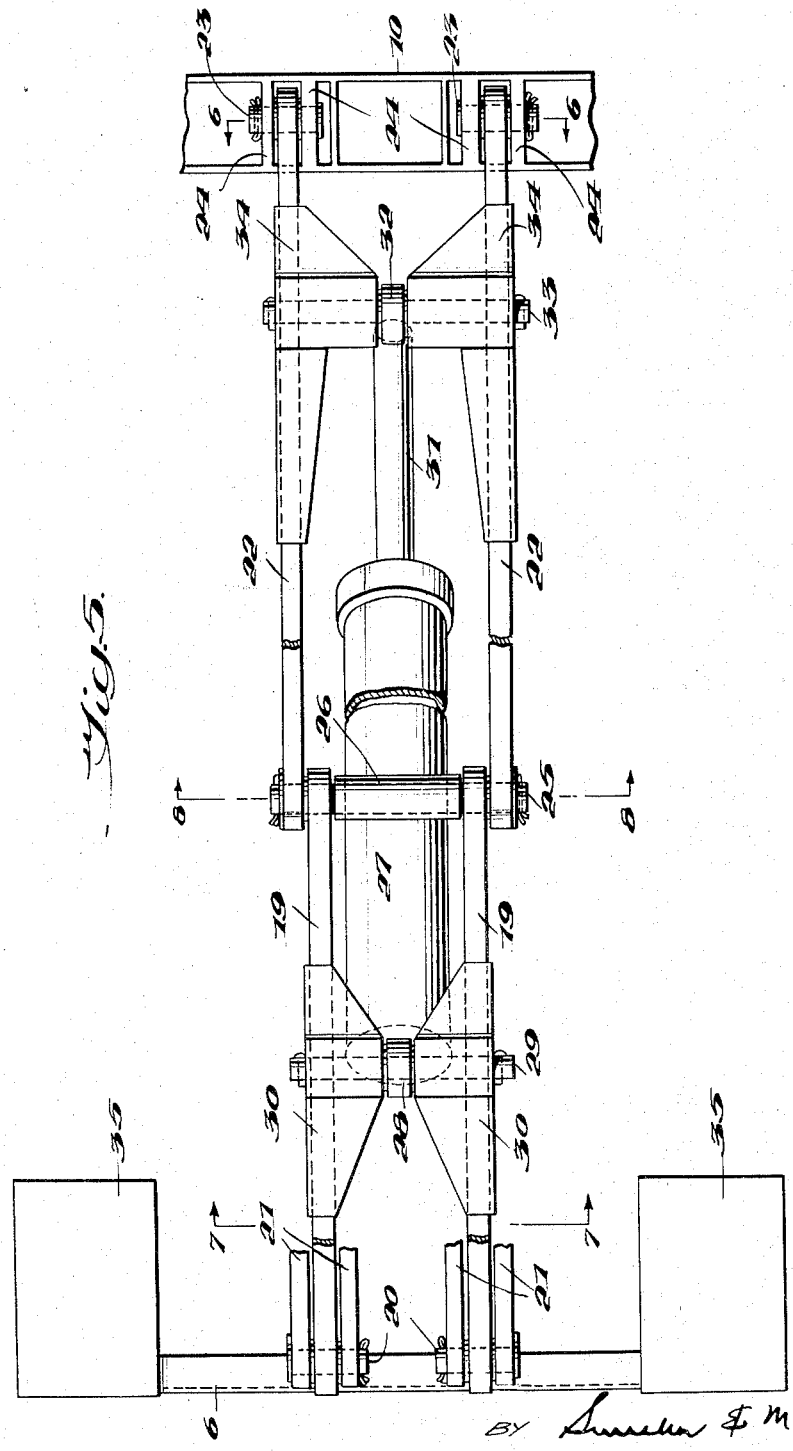

Jan. 20, 1959  G. R. DEMPSTER  2,869,740
TRANSPORTING EQUIPMENT
Filed April 10, 1956  4 Sheets-Sheet 4
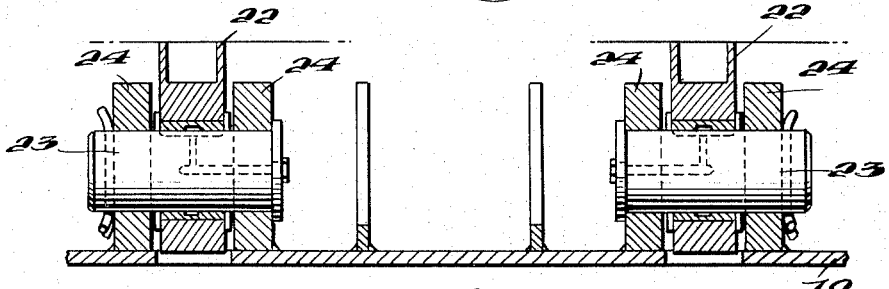
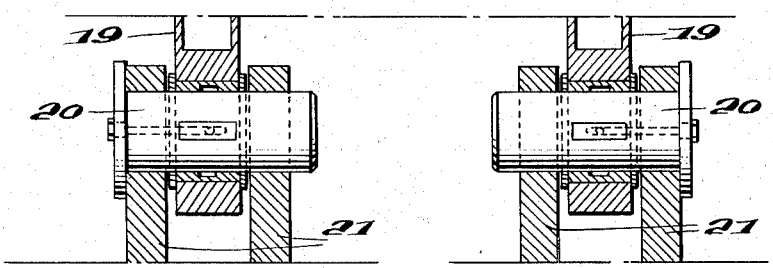
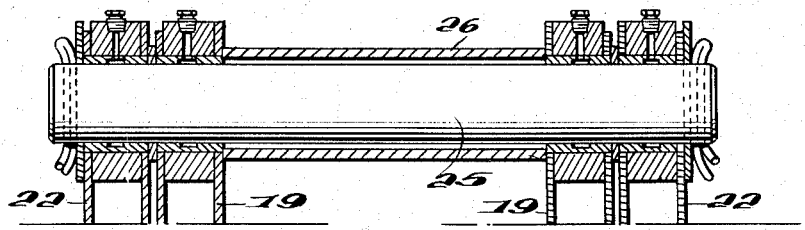
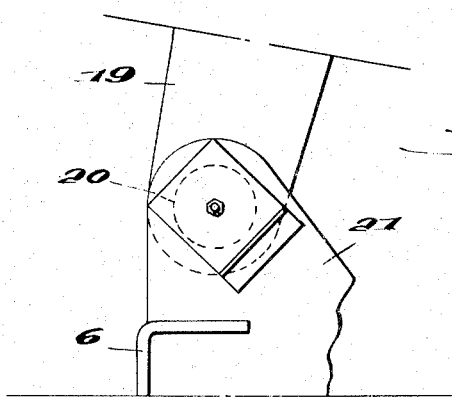
INVENTOR
GEORGE R. DEMPSTER,
BY
ATTORNEYS United States Patent Office 2,869,740
Patented Jan. 20, 1959

2,869,740

TRANSPORTING EQUIPMENT

George R. Dempster, Knoxville, Tenn.

Application April 10, 1956, Serial No. 577,284

12 Claims. (Cl. 214—75)

This invention relates to improvements in transporting equipment of the type adapted to raise and lower containers or other loads with respect to a vehicle, and more particularly to the type of transporting equipment set forth in my prior Patent No. Re. 23,546, granted September 9, 1952.

In transporting equipment of the type referred to in the aforesaid patent, a frame is mounted on a vehicle chassis upon which is supported a carriage with means for guiding the carriage in its movement forward and backward of the vehicle chassis. Elevating mechanism is provided on the carriage for raising and lowering a container or other article to be transported, whereby the container can be lifted to a point above the supporting frame of the transporting equipment, moved forward on the carriage to a suitable position over the chassis frame and then lowered to a seated position for transportation.

It has been the practice heretofore to use complex structure for moving the carriage forward and backward with respect to the chassis as by means of an intricate chain drive system employing a hydraulic motor, a speed reducer and a series of roller chains with accompanying sprockets. Such structure is both complex and expensive to build and to operate and is subject to requiring considerable servicing in operation.

It has also been proposed, according to the above-mentioned patent, to use a hydraulic cylinder for movement of the carriage forward and backward with respect to the vehicle chassis. Even with telescoping sections of the cylinder, as shown in such patent, this requires an extremely long travel that makes it expensive to build and difficult to maintain in operating condition and would be unsatisfactory for use.

One object of this invention is to overcome the foregoing objections by simplifying and improving the manner of moving the carriage forward and backward with respect to the vehicle chassis and making the structure economical to manufacture and use.

Another object of the invention is to provide for the use of a hydraulic cylinder in accomplishing the forward and backward movement of the carriage, but with a minimum of travel of the cylinder in accomplishing the required or desired movement of the carriage.

Still another object of the invention is to provide a compound linkage structure for controlling and moving the carriage of transporting equipment of the character mentioned, which linkage may be operated by a hydraulic cylinder combined with the linkage so that a relatively short stroke of the cylinder will nevertheless accomplish the required movement of the carriage.

These objects may be accomplished, according to one embodiment of the invention, by connecting with the carriage and the subframe of the transporting equipment a pair of link devices that are pivotally connected to each other at adjacent ends. A cylinder or cylinders then interconnect the link devices, whereby a relatively short stroke of the cylinder is sufficient to accomplish a desired movement of the carriage to the extent needed for transporting a container or other article thereby to a supported position on the chassis. The cylinder should be supported at one end on one of the links and extend therefrom to the other. Then, upon extending or collapsing movement of the cylinder, it will be moved bodily by the swinging movement of said link and thereby achieve the desired movement of the carriage with a minimum of action of the cylinder.

This embodiment of the invention is illustrated in the accompanying drawings, in which:

Fig. 1 is a side elevation of transporting equipment of the type described, showing the invention applied thereto, and with the container in its forward transport position;

Fig. 2 is a similar view, showing the carriage moved to its rear position;

Fig. 3 is a perspective view of the transporting equipment;

Fig. 4 is a detail cross section, showing the pivotal connection of one of the link devices with the carriage;

Fig. 5 is a top plan view of the operating mechanism for the carriage;

Fig. 6 is a cross section through the pivotal connection of the link devices with the carriage on the line 6—6 in Fig. 5;

Fig. 7 is a cross section through the link devices with the subframe on the line 7—7 in Fig. 5;

Fig. 8 is a cross section through the pivotal connection between the front and back link devices on the line 8—8 in Fig. 5; and Fig. 9 is a detail side elevation, showing the mounting of the front link devices on the subframe.

Referring to Figs. 1 and 2 of the drawings, the numeral 1 indicates the chassis of a conventional motor vehicle, such as a truck or other power operated mechanism, shown as mounted on wheels 2, and may be steered at the front or rear thereof. A cab is indicated generally at 3 for enclosing the operator and may be used if desired.

Mounted on the chassis frame 1 is a subframe, generally indicated at 4, which subframe includes a pair of longitudinally extending channel-shaped tracks 5, connected together at the forward and backward ends thereof to provide a rigid frame structure that is mounted on the chassis 1. A front cross member is indicated at 6, while the back ends of the tracks 5 are shown as connected together by a cross member 7, which may also form a bumper or guide apron, if desired.

Mounted upon the tracks 5 is a carriage structure, generally indicated at 8. The carriage structure 8 includes a pair of side members provided with slide members, such as rollers 9, guided and movably mounted in the tracks 5. These opposite side members are connected together by an intermediate cross member 10, as shown in Figs. 3 and 5.

The carriage 8 also includes a pair of upright guide members 11 within which is mounted an elevator structure, generally indicated at 12, capable of raising and lowering movements with respect to the upright guideways 11 under the action of a pair of hydraulic cylinders 13, mounted on the carriage 8 and connected with the elevator 12. As shown in the aforesaid Patent No. Re. 23,526, the elevator 12 may be provided with lifting forks or with cables. In the form shown, the elevator 12 includes a pair of guide members, such as sheaves 14, over which flexible cable devices 15 extend, being anchored at one end to a cross member 16 on the carriage 8 and being connected at their opposite ends with lifting pins 17 on a container 18. The article to be lifted and transported is described as a container merely as an example of the use of this invention and in accordance with the disclosure in the aforesaid prior patent.

The mounting, construction and operation of the carriage 8 and its lifting mechanism may be substantially as described in the aforesaid patent, No. Re. 23,546.

Mounted on the subframe 4 intermediate the front end thereof and the carriage 8 is mechanism for moving the carriage forward and backward with respect to the tracks 5, as, for example, in the positions shown in Figs. 1 and 2. In this embodiment of the invention, the mechanism comprises a pair of link devices pivotally connected together at adjacent ends and one of which is pivotally mounted on the forward end of the subframe 4 and the other link device is pivotally connected with the carriage.

As shown in Figs. 3 and 5, the forward link device comprises a pair of link members arranged side by side and indicated at 19. Each of these link members 19 is pivotally connected at 20 with upstanding fulcrum plates 21 (see Fig. 7) provided on the cross member 6 of the subframe 4. These pivotal connections are shown more in detail in Figs. 7 and 9.

A rear link device comprises a pair of links 22 arranged in side-by-side relation, as shown in Figs. 3 and 5. The links 22 are pivotally connected by means of fulcrum pins 23, with fulcrum plates 24 on the intermediate cross member 10 of the carriage 8. This pivotal connection is shown more in detail in Fig. 6.

The links 19 and 22 are pivotally connected together by an elbow hinge pin 25 extending through the adjacent ends of the links 19 and 22, as shown in Fig. 5 and also in Fig. 8. A spacer 26 holds the adjacent ends of the links 19 apart, and suitable means is provided for providing flexibility of relative movement of these adjacent ends of the links, as shown.

Thus, the link devices 19 and 22 form an articulated connection extending from the front end of the subframe 4 to the carriage 8 and provide for relative movement of the carriage forward and backward with respect to the subframe according to the shifting positions of the link devices with respect to each other. Two of such positions are shown in Figs. 1 and 2 and also in Fig. 3.

This movement is accomplished, according to the preferred embodiment of the invention, by one or more hydraulic power devices, one of which is shown in this example and is indicated at 27. The cylinder of the power device 27 has a mounting plate, indicated at 28, journaled on a pin 29 that extends transversely through brackets 30 provided on the respective links 19. These parts form a pivotal connection of one end of the power device 27 with the links 19 intermediate the ends thereof.

The piston rod of the power device is indicated at 31 and extends outwardly from the cylinder thereof, as shown in Figs. 1 to 5. This piston rod 31 is pivotally connected by means of a mounting plate 32, with a pin 33 extending transversely between brackets 34 mounted on the links 22 intermediate the ends thereof.

It will be apparent from Figs. 1 and 2 that the hydraulic power device 27 forms a tie connection between the links 19 and 22 intermediate their respective ends. Therefore, upon expanding or contracting action of the hydraulic power device 27, the links 19 and 22 will open or close relative to each other about the pivotal connection 25 between their adjacent ends. Inasmuch as the front end portion of this linkage 19—22 is anchored at 20 to the subframe 4, this relative swinging movement between the links will cause the carriage 8 to be moved forward and backward with respect to the tracks 5.

The usual hydraulic systems for supplying and controlling the fluid to the cylinders 13 and 27 are not illustrated in detail, inasmuch as these are well understood in the art and any suitable form of control means may be used as desired, preferably within the convenient reach of the operator in the cab 3. The source of hydraulic fluid is illustrated at 35 comprising a pair of tanks located on the forward end of the subframe 4. Suitable connections are made from these tanks to the pumps and control valves, as will be apparent to any one skilled in the art and familiar with such constructions.

The operation of the transporting equipment will be apparent from the foregoing description, taken together with the disclosure contained in my prior Patent No. Re. 23,546. The truck or other vehicle embodying the invention may be moved up to the container 18, with the carriage 8 at its rear position, as exemplified in Fig. 2 and with the elevator 12 lowered, as also shown therein. The end connections on the cables 15 or the lifting forks on the elevator 12, as referred to above are engaged with the lifting pins 17 at opposite ends of the container 18, or other suitable points of connection with the container or other article to be elevated, and the hydraulic cylinders 13 are then operated to raise the elevator 12 and thereby lift the cylinders 13 to a point sufficient to clear the subframe 4 above the chassis.

Thereafter, the hydraulic cylinders 27 are operated to withdraw the pistons and piston rods 31 to collapsed relation, inwardly toward the left, as viewed in Figs. 1 and 2, which will thereby shorten the distance between the pivotal connections 29 and 33 from the position shown in Fig. 2 to the position shown in Fig. 1. This action will cause a movement of the carriage 8 forward relative to the chassis frame 1 and the subframe 4. Then, upon lowering of the elevator 12, the container 18 can be moved downward to a seated position on suitable rests provided on the subframe 4.

This action is reversed in moving the container 18 from the position shown in Fig. 1 to its rearward position shown in Fig. 2. First the cylinders 13 should be operated to raise the elevator 12, after which the cylinder 27 is supplied with fluid under pressure in the opposite end, so as to swing the links 19 and 22 relatively and thereby move the carriage 8 rearward of the chassis frame to a point where the container can be lowered clear of the latter. When that position is reached, the elevator 12 is lowered to drop the container to the surface of the ground.

In this way, the carriage is moved fore and aft of the vehicle by the action of the links and double-acting hydraulic power device 27 in a very simple and inexpensive construction which may be operated in a comparatively short stroke. There are no complex parts to cause difficulty of operation or to require extensive service. The entire operating means is simple and inexpensive to build and practical for operation. Moreover, it requires only a short stroke and economy of operation.

While the invention has been illustrated and described in one embodiment, it is recognized that other variations and changes may be made therein without departing from the invention, as set forth in the claims.

I claim:

1. In transporting equipment, the combination of a base, a carriage mounted on the base for fore and aft movement relative thereto, means on the carriage for lifting a container and supporting the container during said fore and aft movement, and means operatively connected with the carriage and base for moving the carriage fore and aft relative thereto, said means comprising a pair of links pivotally connected together at adjacent ends, means pivotally connecting one of the links at its opposite end to the base, means pivotally connecting the other link at its opposite end to the carriage, and power operating means connected with the respective links spaced from the point of pivotal connection therebetween for causing relative movement between the links to move the carriage.

2. In transporting equipment, the combination of a base, a carriage mounted on the base for fore and aft movement relative thereto, means on the carriage for lifting a container and supporting the container during said fore and aft movement, means operatively connected with the carriage and base for moving the carriage fore and aft relative thereto, said means comprising a pair of links pivotally connected together at adjacent ends, means pivotally connecting one of the links at its opposite end to the base, means pivotally connecting the other link at its opposite end to the carriage, and a power device connected with the links intermediate the lengths thereof and spaced from the pivotal connection between the links and operative to move the links for thereby causing movement of the carriage.

3. In transporting equipment, the combination of a base, a carriage mounted on the base for fore and aft movement relative thereto, means on the carriage for lifting a container and supporting the container during said fore and aft movement, means operatively connected with the carriage and base for moving the carriage fore and aft relative thereto, said means comprising a pair of links pivotally connected together at adjacent ends, means pivotally connecting one of the links at its opposite end to the base, means pivotally connecting the other link at its opposite end to the carriage, and extensible means operatively connecting the links together intermediate their ends for causing relative swinging movement therebetween to move the carriage fore and aft relative to the base.

4. In transporting equipment, the combination of a base, a carriage mounted on the base for fore and aft movement relative thereto, means on the carriage for lifting a container and supporting the container during said fore and aft movement, means operatively connected with the carriage and base for moving the carriage fore and aft relative thereto, said means comprising a pair of links pivotally connected together at adjacent ends, means pivotally connecting one of the links at its opposite end to the base, means pivotally connecting the other link at its opposite end to the carriage, and a fluid power device connected in bridging relation between the links intermediate their ends for causing relative swinging movement of the links to move the carriage fore and aft.

5. In transporting equipment, the combination of a base, a carriage mounted on the base for fore and aft movement relative thereto, means on the carriage for lifting a container and supporting the container during said fore and aft movement, means operatively connected with the carriage and base for moving the carriage fore and aft relative thereto, said means comprising a pair of links pivotally connected together at adjacent ends, means pivotally connecting one of the links at its opposite end to the base, means pivotally connecting the other link at its opposite end to the carriage, and a hydraulic power device connected at one end with one link and at its opposite end with the other link intermediate the length of said links whereby upon actuation of the power device the links are moved relatively to each other for causing said movement of the carriage.

6. In transporting equipment, the combination of a base, a carriage mounted on the base for fore and aft movement relative thereto, means on the carriage for lifting a container and supporting the container during said fore and aft movement, a pair of links extending lengthwise of the base, means pivotally connecting adjacent ends of the links together, means pivotally connecting one end of one of the links with the base, means pivotally connecting the other end of the link with the carriage, and a hydraulic power device comprising a cylinder pivotally connected with one link intermediate its ends and a piston pivotally connected with the other link intermediate its ends, said hydraulic power device extending in bridging relation between the links and adapted upon actuation to cause relative swinging movement of the links with respect to each other thereby to move the carriage fore and aft relative to the base.

7. In transporting equipment, the combination of a base, a carriage mounted on the base for fore and aft movement relative thereto, means on the carriage for lifting a container and supporting the container during said fore and aft movement, means operatively connected with the carriage and base for moving the carriage fore and aft relative thereto, said means comprising a pair of links pivotally connected together at adjacent ends, means pivotally connecting one of the links at its opposite end to the base, means pivotally connecting the other link at its opposite end to the carriage, and a fluid power device connected with one link and with the carriage for causing relative swinging movement of the links with respect to each other thereby to cause said fore and aft movement of the carriage relative to the base.

8. In transporting equipment, the combination of a base provided with horizontally extending ways, a cross member connected with the base at one end thereof and extending transversely of the ways, a carriage mounted on the ways for movement in a fore and aft direction with respect thereto, means for supporting a container on the carriage and for raising and lowering the container with respect thereto, said carriage including a cross member, a pair of fulcrum plates mounted on each of the cross members of the base and carriage, a pair of links arranged in end-to-end relation, a journal pin pivotally connecting the links together at adjacent ends, each of the links at its opposite end extending between a pair of said fulcrum plates, and a fulcrum pin extending through the fulcrum plates and intermediate end portion of each link for pivotally connecting the respective links with the cross members of the base and carriage respectively.

9. In transporting equipment, the combination of a base provided with horizontally extending ways, a cross member connected with the base at one end thereof and extending transversely of the ways, a carriage mounted on the ways for movement in a fore and aft direction with respect thereto, means for supporting a container on the carriage and for raising and lowering the container with respect thereto, said carriage including a cross member, a pair of fulcrum plates mounted on each of the cross members of the base and carriage, two pairs of links arranged in end-to-end relation with the links of each pair spaced apart transversely, an elbow hinge pin extending through adjacent links of the respective pairs and pivotally connecting said pairs of links together, a spacer sleeve surrounding said elbow hinge pin and holding the links of each pair spaced apart transversely, the opposite ends of each pair of links extending between respective pairs of fulcrum plates, fulcrum pins pivotally connecting said links with the respective pairs of fulcrum plates.

10. In transporting equipment, the combination of a base provided with horizontally extending ways, a cross member connected with the base at one end thereof and extending transversely of the ways, a carriage mounted on the ways for movement in a fore and aft direction with respect thereto, means for supporting a container on the carriage and for raising and lowering the container with respect thereto, said carriage including a cross member, a pair of fulcrum plates mounted on each of the cross members of the base and carriage, two pairs of links arranged in end-to-end relation with the links of each pair spaced apart transversely, an elbow hinge pin extending through adjacent links of the respective pairs and pivotally connecting said pairs of links together, a spacer sleeve surrounding said elbow hinge pin and holding the links of each pair spaced apart transversely, the opposite ends of each pair of links extending between respective pairs of fulcrum plates, fulcrum pins pivotally connecting said links with the respective pairs of fulcrum plates, brackets mounted on the respective links intermediate their ends, pivot pins extending transversely between the brackets of each pair of links, and a hydraulic power device connected at one end with one of said pivot pins and at its opposite end with the other of said pivot pins for causing relative swinging movement of the links about the elbow hinge pin upon relative expanding or collapsing movement of the hydraulic power device.

11. In transporting equipment, the combination of a base, a carriage mounted on the base for fore and aft movement relative thereto, means on the carriage for lifting a container and supporting the container during said fore and aft movement, means operatively connected with the carriage and base for moving the carriage fore and aft relative thereto, said means comprising a pair of links pivotally connected together at adjacent ends, means pivotally connecting one of the links at its opposite end to the base, means pivotally connecting the other link at its opposite end to the carriage, and an extensible hydraulic power device pivotally connected at one end with the link connected with the base and at its opposite end with the carriage and extending in bridging relation therebetween for causing relative swinging movement between the links to move the carriage fore and aft relative to the base.

12. In transporting equipment, the combination of a base, a carriage mounted on the base for fore and aft movement relative thereto, means on the carriage for lifting a container and supporting the container during said fore and aft movement, means operatively connected with the carriage and base for moving the carriage fore and aft relative thereto, said means comprising a pair of links pivotally connected together at adjacent ends, means pivotally connecting one of the links at its opposite end to the base, means pivotally connecting the other link at its opposite end to the carriage, and an extensible hydraulic power device pivotally connected at one end with the link connected with the base and at its opposite end with the carriage and extending in bridging relation therebetween.

References Cited in the file of this patent

UNITED STATES PATENTS

| | | |
|---|---|---|
| 2,311,523 | Cope et al. | Feb. 16, 1943 |
| 2,606,676 | Dempster | Aug. 12, 1952 |
| 2,619,241 | Jessen | Nov. 25, 1952 |
| 2,751,100 | Dempster et al. | June 19, 1956 |